(12) United States Patent
Scott

(10) Patent No.: US 11,436,423 B2
(45) Date of Patent: Sep. 6, 2022

(54) KIT AND METHOD FOR IMPROVING THE SECURITY OF A CARD READER

(71) Applicant: Cennox ATM Parts Ltd., Camberley (GB)

(72) Inventor: Katherine Elizabeth Scott, Aldershot (GB)

(73) Assignee: CENNOX LIMITED, Camberley (GB)

( * ) Notice: Subject to any disclaimer, the term of this patent is extended or adjusted under 35 U.S.C. 154(b) by 0 days.

(21) Appl. No.: 16/803,444

(22) Filed: Feb. 27, 2020

(65) Prior Publication Data

US 2020/0279081 A1    Sep. 3, 2020

(30) Foreign Application Priority Data

Feb. 28, 2019 (GB) ...................................... 1902694

(51) Int. Cl.
| | | |
|---|---|---|
| *G06K 7/10* | (2006.01) | |
| *G07F 7/08* | (2006.01) | |
| *G07F 19/00* | (2006.01) | |

(52) U.S. Cl.
CPC ....... *G06K 7/10277* (2013.01); *G07F 7/0873* (2013.01); *G07F 19/2055* (2013.01)

(58) Field of Classification Search
CPC .... G06K 13/02; G06K 13/08; G06K 7/10277; G06K 7/0034; G06K 7/0039; G07F 7/0873; G07F 19/2055
USPC ......................................... 235/435, 379, 380
See application file for complete search history.

(56) References Cited

U.S. PATENT DOCUMENTS

| | | | |
|---|---|---|---|
| 5,933,328 A | 8/1999 | Wallace et al. | |
| 2004/0155104 A1 | 8/2004 | Mitchell, Jr. | |
| 2008/0315902 A1* | 12/2008 | Kobayashi | G11C 5/143 |
| | | | 324/756.03 |
| 2013/0095915 A1* | 4/2013 | Park | G06K 13/08 |
| | | | 463/25 |
| 2017/0086291 A1* | 3/2017 | Cotton | H02S 40/36 |

FOREIGN PATENT DOCUMENTS

| | | |
|---|---|---|
| DE | 10025394 A1 | 12/2001 |
| DE | 102011104008 A1 | 12/2012 |

OTHER PUBLICATIONS

"Couple." Merriam-Webster's Collegiate Dictionary. 10th ed. 1998. Print (Year: 1998).*
European office action for corresponding European patent application No. 20160054.1, dated May 27, 2021.
Search Report for corresponding United Kingdom application No. GB1902694.7, dated Aug. 12, 2019.
Extended European search report for corresponding European patent application No. 20160054.1, dated Jul. 17, 2020.

* cited by examiner

*Primary Examiner* — Suezu Ellis
(74) *Attorney, Agent, or Firm* — Notaro, Michalos & Zaccaria P.C.

(57) ABSTRACT

A kit and method for improving the security of a card reader having a plurality of wafers for insertion individually into the card reader via a card slot in the card reader, where each wafer is shaped and sized so that the wafer can be inserted through the card slot in an insertion direction and positioned in a cavity in the card reader. The plurality of wafers are configured to couple together when inside the cavity to form a stack of wafers.

6 Claims, 9 Drawing Sheets

KIT AND METHOD FOR IMPROVING THE SECURITY OF A CARD READER

TECHNICAL FIELD OF THE INVENTION

The invention relates to a kit and method for improving the security of a card reader, and in particular to a kit and method for restricting the placement of unauthorised objects in a card reader.

BACKGROUND TO THE INVENTION

Smart cards (e.g. cards including an electronic chip) and magnetic stripe cards are increasingly being used to store and/or access sensitive information, including banking details and identification details. However, as security techniques improve, fraudsters continue to devise new techniques for illegitimately obtaining information stored on smart cards and magnetic stripe cards.

One such technique is skimming, in which a fraudster will typically place a small tamper device into a card entry slot in a card reader in a payment terminal or other card terminal to read a card that is inserted into the payment terminal or card terminal by a user. The fraudster can also use some means (e.g. video streaming) for monitoring or recording the user's Personal Identification Number (PIN) as they type it into the payment terminal or card terminal.

The tamper device reads information from the inserted card (e.g. by reading the magnetic stripe as the card is inserted or intercepting the inputs and/or outputs of the electronic chip) and the fraudster can then use the obtained information to create an unauthorised copy of the card or access sensitive information. If the card is a bank card, the fraudster may also be able to use the obtained information to make unauthorised transactions.

To counter this problem, card entry slots in card readers are often shaped to prevent objects much larger than a card from being inserted. The card readers may also be sealed to prevent the interior of the card reader from being tampered with if the payment terminal or card terminal is opened. However, tamper devices have been developed which are of a similar size to or are smaller than a card so that they can be inserted into a card reader through a card entry slot in the card reader. In addition, there are often cavities inside the card reader in which tamper devices can be positioned so that the tamper device is not visible to a user once it is installed, but the tamper device is still able to read a card inserted into the card reader.

Therefore, there is a need for ways to counter the use of these types of unauthorised objects or devices inside card readers.

SUMMARY OF THE INVENTION

According to a first aspect of the invention, there is provided a kit for improving the security of a card reader. The kit comprises a plurality of wafers for insertion individually into the card reader via a card slot in the card reader, wherein each wafer is shaped and/or sized such that the wafer can be inserted through the card slot in an insertion direction and positioned in a cavity in the card reader. The plurality of wafers are configured to couple together when inside the cavity to form a stack of wafers. The stack of wafers may thus fill and/or block access to at least part of the cavity in the card reader and prevent the positioning of an unauthorised object, such as a tamper device, in the cavity.

In particular embodiments of the invention, the wafers in the kit are shaped and/or sized to fit the cavity in the card reader such that movement of the stack of wafers within the cavity is restricted. One or more of the wafers may be shaped and/or sized so that the one or more wafers comprise one or more protrusions or edges for contacting one or more parts of an internal structure of the card reader such that movement of the stack of wafers within the cavity is restricted. The protrusions may extend from a plane of the wafer. In these embodiments, the protrusions are preferably deformable to enable the respective wafer to be inserted into the card reader via the card slot.

In some embodiments, the plurality of wafers comprises a final wafer that is for insertion into the card reader after all other wafers in the plurality of wafers have been inserted into the card reader. In these embodiments, the final wafer is preferably shaped to prevent an unauthorised object positioned in the cavity from contacting a magnetic stripe and/or an electronic chip of a card as or when the card is inserted into the card reader. The final wafer may be shaped such that the stack of wafers prevents a card from being fully inserted into the card reader when an unauthorised object is also present in the card reader above the final wafer.

Other embodiments of the first aspect are envisaged and described below with reference to the Figures.

According to a second aspect of the invention, there is provided a method for improving the security of a card reader using the kit as described above. The method comprises individually inserting each wafer in the plurality of wafers into the card reader via the card slot in the card reader.

In particular embodiments, the plurality of wafers are configured to couple together using an adhesive applied to a surface of at least one wafer in the plurality of wafers. The method may further comprise, for each of the at least one wafers with an adhesive applied to its surface, applying a temporary barrier coating to the adhesive prior to inserting the wafer into the card reader.

BRIEF DESCRIPTION OF THE DRAWINGS

Embodiments and examples of the invention will be described below with reference to the following figures.

DETAILED DESCRIPTION OF EMBODIMENTS OF THE INVENTION

Although embodiments of the invention will be described below with reference to payment terminals, and the card readers used therein, it will be appreciated that the invention can be applied to any terminal or device into which a user can insert a smart card or magnetic stripe card through a slot.

Figure 1:
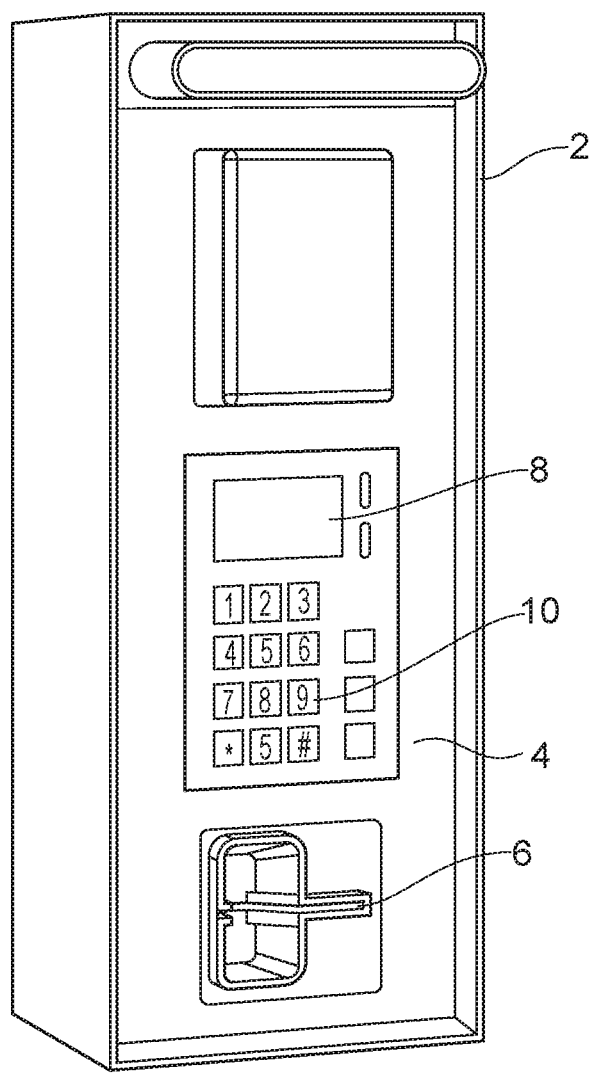
FIG. 1 is an illustration of a payment terminal.

FIG. 1 is an illustration of a payment terminal 2. The payment terminal 2 comprises a fascia 4 having an external card slot 6 into which a user can insert their card, a display 8 for presenting information to a user and a keypad 10 for allowing a user to input their Personal Identification Number (PIN).

Figure 2:
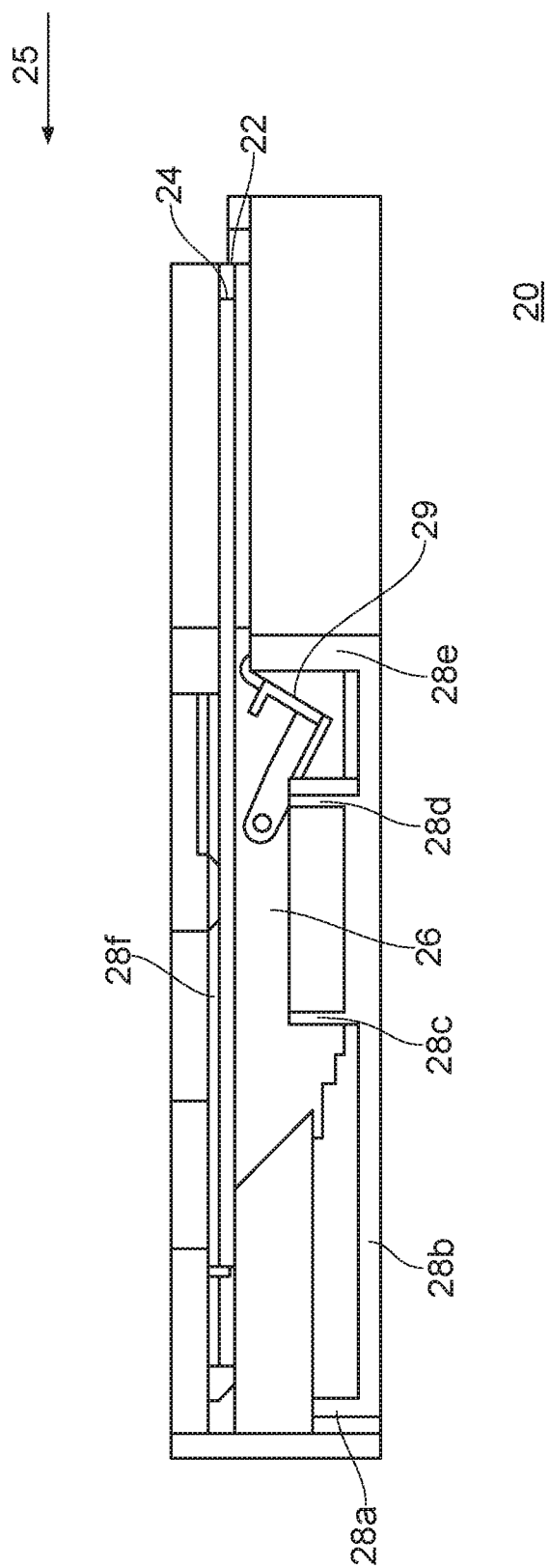
FIG. 2 is an illustration of the interior of a card reader in which the invention can be used.

FIG. 2 is a cut-away side view of a card reader 20 in which the invention may be used. The card reader 20 may, for example, form part of the payment terminal 2. In an alternative example, the card reader may form part of an automated teller machine (ATM).

As illustrated, the card reader 20 comprises a slot 22 through which a card 24 has been inserted (in a direction indicated by arrow 25). It will be apparent to the skilled reader that the card reader 20 may comprise any number of components not illustrated here. For example, the card reader may comprise a magnetic stripe reader and/or an electronic chip reader.

The card reader 20 further comprises a number of internal structures, including a number of walls 28a-28f defining a cavity 26 inside the card reader 20, and other internal structures such as a gate 29. The gate 29 at least partially covers or closes off the card slot in the card reader when a card is not being inserted into the card reader.

As described in the background section, fraudsters can insert a tamper device into the card reader 20 via the card slot 22. The tamper device may thus be positioned in the cavity 26 in the card reader 20. Once the tamper device is positioned inside the card reader 20, it may, for example, be used to read information from a magnetic stripe as the card 24 is inserted and/or to read an electronic chip on card 24 once it is inserted into the card reader 20.

The card reader 20 may be a sealed card reader unit, which means that the card reader 20 cannot be easily or readily disassembled (for example by an engineer that is servicing the card reader 20 or payment terminal) in order to gain access the interior of the card reader. As such, it is typically not possible to disassemble existing card readers 20 to retrofit protection against the types of tamper devices that can be inserted through the card slot 22.

Embodiments of the disclosure provide a kit for improving the security of the card reader 20. The kit comprises a plurality of wafers that can be individually inserted into the card reader 20 via the card slot 22. Each wafer is sized so that it can be individually inserted into the card reader 20 via the card slot 22 and positioned inside the cavity 26. The wafers are configured to couple to one another once inside the card reader to form a stack of wafers in the cavity (i.e. a stack where one wafer is on top of another). The stack of wafers thus fills and/or blocks access to at least part of the cavity and prevents the positioning of an unauthorised object, such as a tamper device, in the cavity 26.

Figure 3:
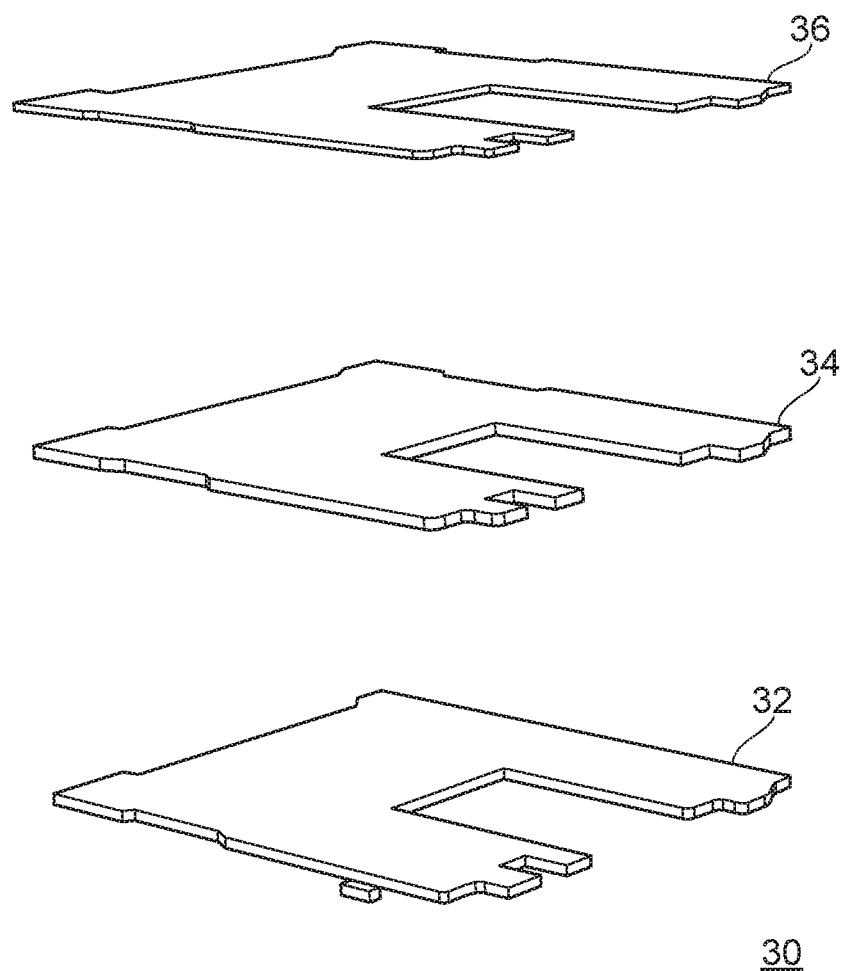
FIG. 3 is an illustration of a kit according to a first embodiment of the invention.

FIG. 3 illustrates a kit 30 according to a first embodiment of the invention. The kit 30 comprises three wafers 32-36, however, two or more wafers may be provided or used without departing from the scope of the invention.

As noted above, each wafer 32-36 may be any suitable shape and/or size that allows the wafer 32-36 to be inserted into a card reader 20 via a card slot 22 in the reader and positioned in a cavity in the card reader 20. The specific size and/or shape of each wafer can be defined based on the size and/or shape of the cavity to be at least partially filled or blocked, subject to the requirement that each wafer is able to be inserted individually into and through the card slot 22. For example, a wafer may have a length that is no longer than a length of the cavity to allow the wafer to be fully inserted into the cavity.

The specific size and/or shape of each wafer may be defined based on the size and/or shape of a card 24 to be inserted into the card reader. For example, a wafer may have a thickness approximately equal to a thickness of a card 24 (but no more than a height of the card slot 22 in order to facilitate insertion) and/or a width no wider than a width of the card 24 (but no wider than the card slot 22 to facilitate insertion). In addition, the number of wafers can depend on the size (e.g. depth) of the cavity 26 to be filled or blocked, with larger (deeper) cavities requiring larger numbers of wafers, and vice versa.

The shape and/or size of the wafers 32-36 may be specific to a particular card reader 20 or group of card readers. Those skilled in the art will appreciate that the shape, size and configuration of card readers varies between brands, models and intended purpose, and the shape and/or size of the wafers 32-36 may be adapted accordingly. As such, the specific shape of the wafers 32-36 shown in FIG. 3 is exemplary and should not be considered as limiting.

The wafers 32-36 need not be identical in size and/or shape, and a combination of differently sized and/or shaped wafers may be provided in the same kit 30.

Figure 5:
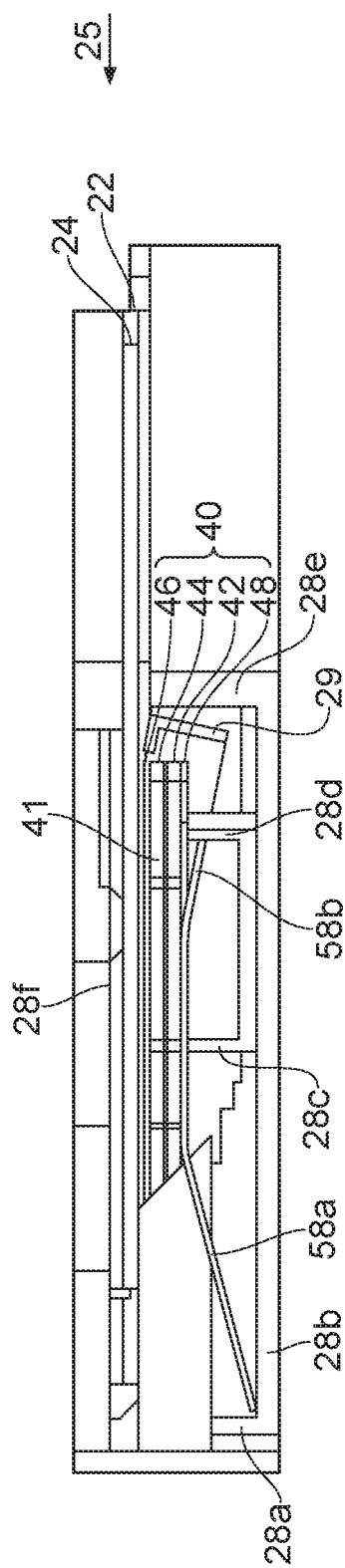
Figure 6:
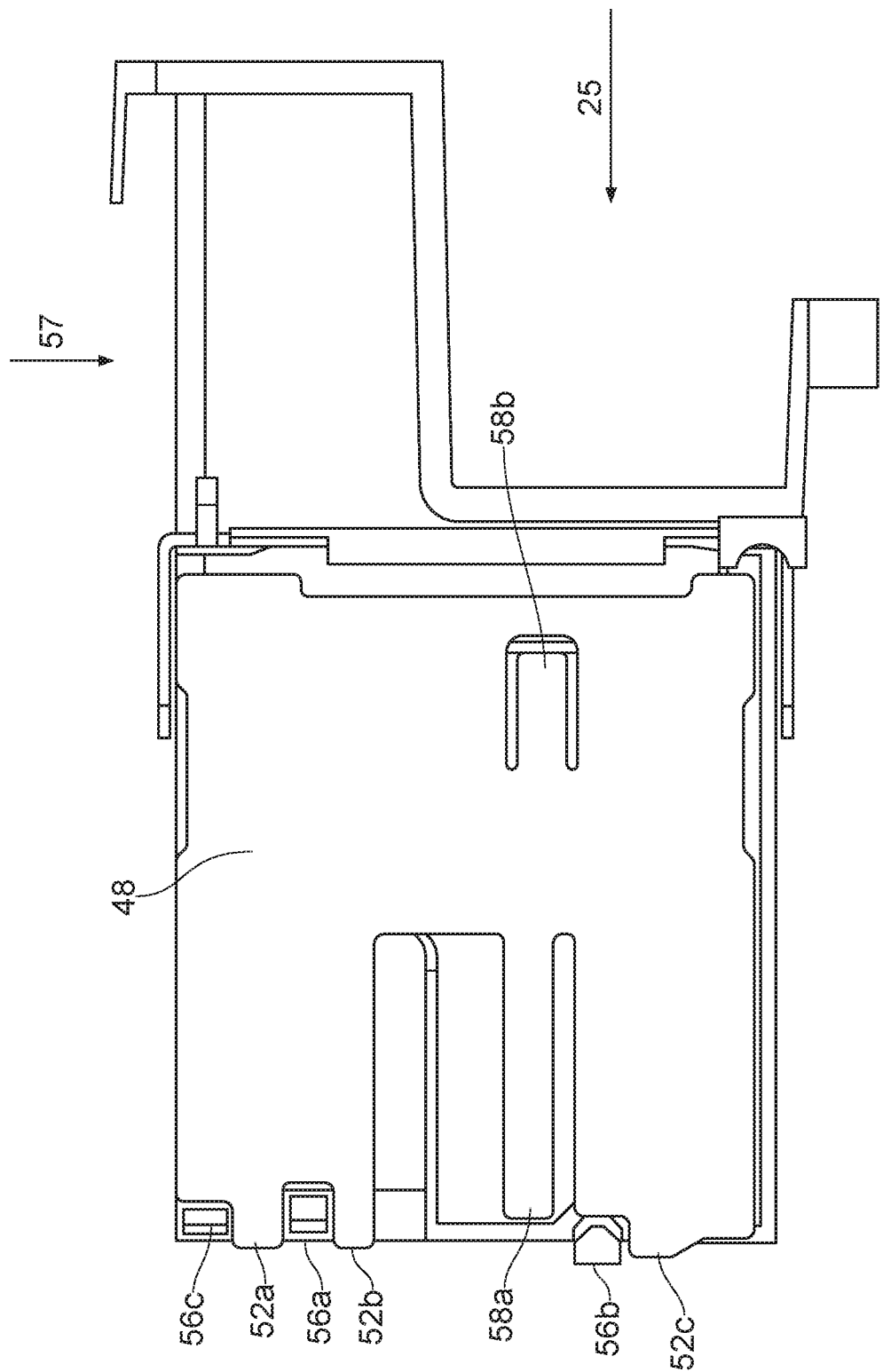

One or more of the wafers 32-36 (or the stack formed by these wafers 32-36) may be shaped and/or sized so that movement of the stack of wafers inside the cavity 26 is restricted. One or more of the wafers 32-36 may thus be sized and/or shaped such that one or more edges of the respective wafer abuts one or more internal structures of the card reader 20 when the respective wafer is positioned in the cavity 26. For example, one or more of the wafers may comprise one or more protrusions or edges for contacting one or more internal structures of the card reader 20 to restrict movement of the stack of wafers in the cavity 26. This is described in more detail below with reference to the second embodiment as shown in FIGS. 5 and 6.

The wafers 32-36 may be formed from any suitable material. In some embodiments, the wafers 32-36 are formed from a rigid material. The wafers 32-36 may be formed from one or more of the following materials: metal (for example, stainless steel), plastic, glass, composite materials, or any other suitable material. The wafers 32-36 may be formed from the material using any suitable production method, for example by cutting or moulding (e.g. injection moulding) material into a required shape, etc. In some embodiments, different materials can be used for the wafers 32-36. For example one or more of the wafers 32-36 can be formed from a first material (e.g. plastic), and other one(s) of the wafers 32-36 can be formed from a second material (e.g. metal). In a particular example, the wafer 36 that is to be inserted through the card slot 22 last (i.e. after the other wafers 32, 34) is formed from metal, and the other wafers 32, 34 can be formed from plastic.

The wafers 32-36 are configured to couple together inside the cavity 26 to form a stack of wafers. The stack of wafers will have a height greater than the height of the card slot 22, which prevents the stack from being removed from the card reader 20 via the card slot 22, thereby preventing a fraudster from removing the kit 30 from the card reader 20.

It will be apparent to the skilled person that there may be any number of ways of configuring the wafers 32-36 to couple together. The wafers may be configured to couple together automatically inside the cavity 26. That is, the wafers 32-36 may be configured such that, after the wafers 32-36 are individually inserted into the card reader, each wafer 32-36 couples to a neighbouring wafer in the cavity 26 without requiring any further intervention from outside the card reader 20.

In some embodiments, the wafers 32-36 are configured to couple together by an adhesive that is applied to one or more of the wafers 32-36. The adhesive may be applied to a surface of one or more of the wafers 32-36 prior to insertion into a card reader 20. For example, an adhesive may be applied to a first wafer 32 and a second wafer 34 prior to insertion into the card reader 20 (including during manufacture of the wafer(s)). The wafers 32-36 are then individually inserted into the card reader 20 via the card slot 22. The adhesive applied to the first wafer 32 couples the first wafer 32 and the second wafer 34 together, and the adhesive applied to the second wafer 34 couples the second wafer 34 and a third wafer 36 together. The wafers 32-36 are thus coupled together to form a stack of wafers.

A temporary barrier coating may applied to the adhesive prior to insertion into the card reader 20 so that the adhesive does not interfere with the insertion of the wafers into the card reader 20 (e.g. by adhering to part of the card slot 22). In some embodiments, the temporary barrier coating comprises a volatile substance. The volatile substance may comprise water or any other suitable substance than can evaporate at typical environmental temperatures. The adhesive applied to one or more of the wafers 32-36 may thus be covered with water before the wafers 32-36 are inserted into the card reader 20. The water provides a barrier that temporarily reduces the stickiness of the adhesive to prevent the wafers 32-36 from adhering to the card reader 20 during insertion. After the water evaporates, the adhesive couples the wafers 32-36 together to form the stack of wafers in the card reader 20.

Alternatively, an adhesive may be applied to the wafers 32-36 after insertion into a card reader 20. For example, the wafers 32-36 may be sprayed with an adhesive via the card slot 22 after they have been inserted into the card reader 20 to couple the wafers together to form the stack of wafers inside the card reader 20.

The adhesive may be provided in any suitable form. The adhesive may, for example, be provided as an adhesive tape (e.g. double-sided sticky tape) or a glue applied to one or more of the wafers 32-36.

In alternative embodiments (not illustrated in FIG. 3), the wafers are configured to couple together using a mechanical mechanism. In one example, the wafers are shaped to slot together after insertion. In another example, one or more of the wafers comprise one or more projections, and a neighbouring wafer includes one or more corresponding indentations or holes for receiving the one or more projections to couple the wafers to one another.

In another example, a hook-and-loop coupling mechanism can be used, with a hook portion provided on the surface of a wafer and a loop portion provided on the surface of an adjacent wafer that faces the hook portion when in the cavity 26.

Figure 4:
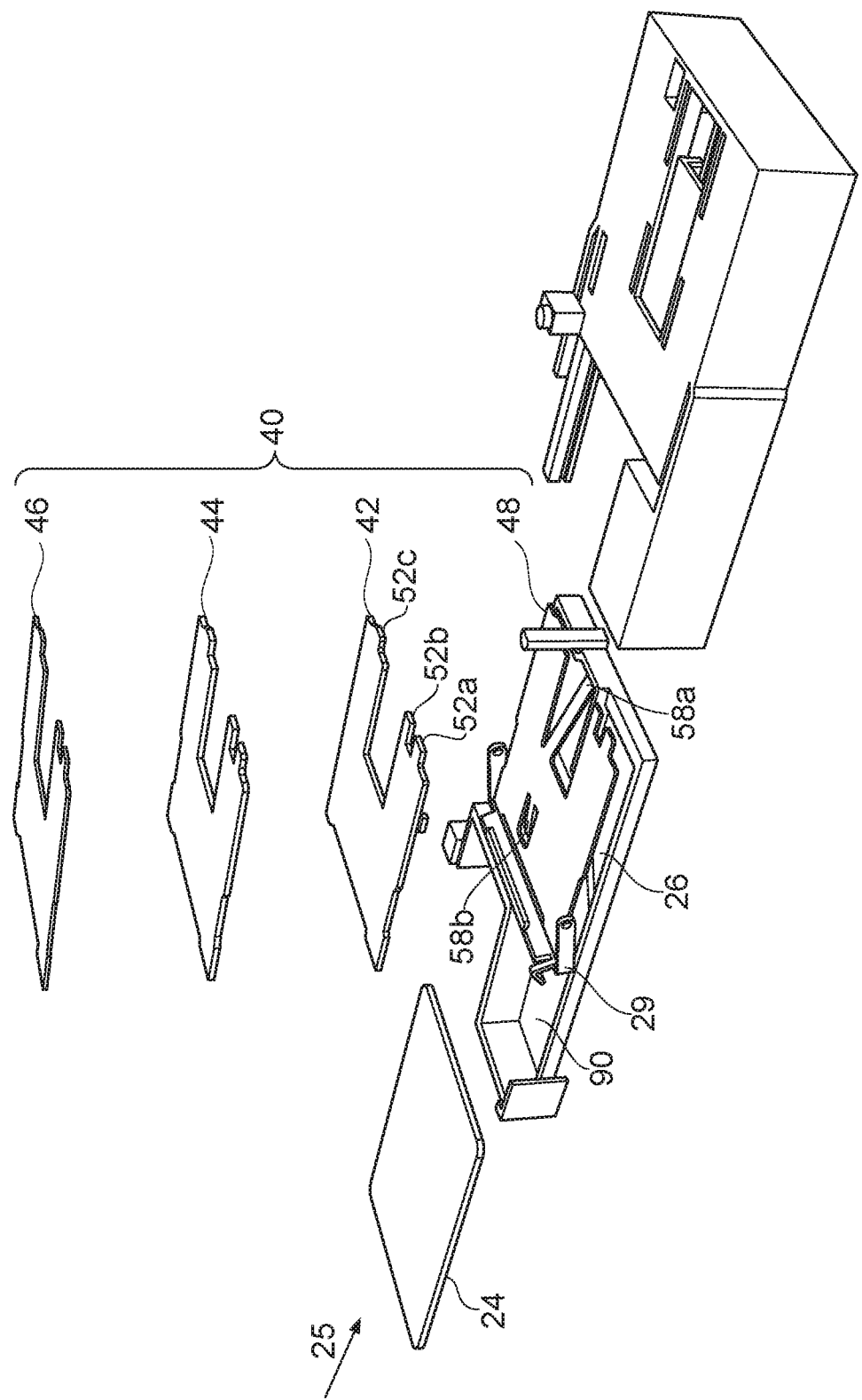
FIGS. 4, 5 and 6 are illustrations of a kit according to a second embodiment of the invention arranged in a card reader.

FIG. 4 is an exploded perspective view of a card reader 20 and a kit 40 according to a second embodiment. FIG. 5 is a cut-away side view of the kit 40 according to the second embodiment arranged as a stack 41 in the card reader 20. In the illustrated embodiment, the kit 40 comprises four wafers 42-48 that can be individually inserted into the card reader 20 in an insertion direction 25 through the card slot 22 in the card reader 20 and positioned in the cavity 26 in the card reader 20. Inside the cavity 26 the wafers 42-48 are coupled together to form a stack of wafers 41. The wafers 42-48 may be coupled together using any of the coupling mechanisms described above with respect to the first embodiment. Any or all of the wafers 42-48 can be shaped and/or sized as described above with respect to the first embodiment. Any or all of the wafers 42-48 can be formed from the exemplary materials described above with respect to the first embodiment. As in the first embodiment, the number of wafers in the kit 40 can be varied depending on the shape and/or size of the cavity 26 or card reader 20.

The four wafers 42-48 comprise a first wafer 48, two intermediate wafers 42, 44 and a final wafer 46. In this embodiment, the intermediate and final wafers 42-46 are similar in shape and size to the wafers 32-36 described above with respect to the first embodiment. The first wafer 48 is to be inserted into the card reader 20 before any of the intermediate and final wafers 42-46. Thus, the first wafer 48 will be positioned underneath the intermediate and final wafers 42-46 in the stack 41 in the card reader 20.

It can be seen in FIG. 5 that the size and/or shape of the wafers 42-48 may be such that the wafers 42-48 are positioned within the cavity 26 of the card reader 20 and still enable the gate 29 to open to allow a card 24 to be inserted and to close after a card 24 is removed to prevent debris or water from entering the card reader 20. A card 24 is also shown inside the card reader 20 in FIG. 5, and it can be seen that, due to the presence of the stack 41, there is very little open space inside the cavity 26. As such, it may not be possible to insert a tamper device into the cavity 26. In an alternative example, if the tamper device has similar or smaller dimensions to a card 24, it may be possible to insert the tamper device into the card reader 20 with the stack 41 in place, but in that case there will be insufficient space in the card reader 20 to enable a card 24 to be inserted or fully inserted. In this context, fully inserting a card 24 into the card reader 20 may be taken to refer to inserting a card 24 into the card reader 20 such that the card can be read by an electronic chip reader and/or magnetic stripe reader in the card reader 20.

One or more of the wafers 42-48 may be shaped and/or sized to restrict movement of the stack of wafers 41 in the cavity 26. One or more of the wafers 42-48 may thus be sized and/or shaped such that one or more edges of the respective wafer abuts one or more internal structures of the card reader 20 when the respective wafer is positioned in the cavity 26. For example, one or more of the wafers may comprise one or more protrusions or edges for contacting one or more internal structures of the card reader 20 (particularly internal structures distal from the card slot 22) to restrict movement of the stack of wafers 41 in the cavity 26. In the illustrated embodiment, each of the wafers 42-48 comprises first, second and third protrusions (or edges) 52a, 52b and 52c (collectively 52) for cooperating with or contacting internal structures of the card reader when the wafers 42-48 are positioned in the cavity 26. These protrusions 52a, 52b and 52c are coplanar with the main body of the wafer 42-46 (i.e. they extend from the main body of the wafer 42-46 in the same plane as the main body of the wafer 42-46).

This is further illustrated in FIG. 6, which shows a cut-away view of the card reader 20 from above the first wafer 48 in the card reader 20 and thus shows the first wafer 48 positioned in the cavity 26 in the card reader 20. The card reader 20 comprises a number of internal structures including first, second and third internal features 56a, 56b and 56c (collectively 56). The first protrusion 52a in the first wafer 48 is positioned between the first internal feature 56a and the third internal feature 56c in the card reader 20 to restrict movement of the first wafer 48 along a lateral direction 57 that is transverse to the insertion direction 25. The second protrusion 52b abuts the first internal feature 56a to also restrict movement of the first wafer 48 in the lateral direction 57. The third protrusion 52c abuts the second internal feature 56b of the card reader 20, thereby restricting lateral movement of the first wafer 48 in the cavity 26. The protrusions 52 thus cooperate with internal structures 56 of the card reader 20 to restrict movement of the first wafer 48 in a direction transverse to the insertion direction 25.

In addition or as an alternative to the protrusions 52 that extend within the main plane of the respective wafer 42-48, one or more of the wafers 42-48 may comprise one or more protrusions that extend from the main plane of the respective wafer (i.e. they extend in a direction perpendicular to the main plane of the wafer). These protrusions can be useful where an internal feature of the cavity 26 lies outside the main plane of the inserted wafer, as this enables part of the wafer (the protrusion) to abut that internal feature. For example, in the illustrated embodiment, the first wafer 48 comprises two further protrusions: a first leg 58a and a second leg 58b (collectively 58). The legs 58 extend from a plane of the first wafer 48 (the main plane of the first wafer 48) to contact parts of the internal structure of the card reader 20 that are below the first wafer 48 when the first wafer 48 is in the cavity 26. The first leg 58a extends downwardly to contact a second internal wall 28a of the card reader 20. The second leg 58b extends downwardly to contact a third internal wall 28d of the card reader 20. As illustrated, the second and third internal walls 28a, 28d define an extent of the cavity 26. The first leg 58a abuts the second internal wall 28a to restrict further movement of the first wafer 48 along the insertion direction 25 (i.e. to restrict movement of the first wafer 48 further into the card reader 20), whereas the second leg 58b abuts the third internal wall 28d to restrict movement of the first wafer 48 opposite to the insertion direction 25 (i.e. to stop the first wafer 48 from being pulled out of the card slot 22). The first and second legs 58a, 58b thus further restrict movement of the first wafer 48 inside the cavity 26. As the first wafer 48 forms part of the stack of wafers 50 that are coupled together inside the cavity 26, the first and second legs 58a, 58b also act to restrict movement of the stack of wafers 41 inside the cavity 26.

Thus one or more wafers in the kit 40 of wafers may comprise one or more protrusions for contacting one or more parts of an internal structure of the card reader 20 such that movement of the stack of wafers 41 within the cavity 26 is restricted.

As the one or more protrusions 58 can extend from the main plane of the respective wafer, it is possible that the height of the wafer may be greater than the height of the card slot 22. Thus the one or more protrusions (legs) 58 may be deformable towards the main plane of the wafer to enable the respective wafer to be inserted into the card reader 20 via the card slot 22. In the illustrated embodiment, the first and second legs 58a and 58b are deformable to enable the first wafer 48 to be inserted through the card slot 22. Thus, before the first wafer 48 is inserted through the card slot 22, the legs 58a, 58b may be pushed towards the main plane of the first wafer 48 to allow the first wafer 48 to be inserted into the card reader 20 via the card slot 22. Preferably, the first and second legs 58a, 58b are resiliently deformable so that each leg 58a, 58b returns to its original configuration (e.g. as shown in FIGS. 4 and 5) once the first wafer 48 has been positioned inside the card reader 20.

Alternatively, the one or more protrusions may be sized to allow the respective wafer to be inserted into the card reader 20 via the card slot 22 without deformation. For example, the first and second legs 58a and 58b may protrude from the main plane of the wafer by a small enough amount that the overall height of the wafer does not exceed the height of the card slot 22. The first wafer 48 may thus be relatively thin despite the presence of the first and second legs 58a and 58b.

Although the first wafer 48 comprises two protrusions (legs) 58a and 58b in the illustrated embodiment, it is apparent to the skilled person that the first wafer 48 may comprise more or fewer protrusions without departing from the scope of the invention. For example, the first wafer 48 may comprise only one protrusion 58a to prevent movement of the first wafer 48 along the insertion direction 25. In another example, the first wafer 48 comprises only one protrusion 58b preventing movement of the first wafer 48 counter to the insertion direction 25.

As with the first embodiment described above, those skilled in the art will appreciate the shape and/or size of the wafers 42-48 in a kit 40 of wafers may be specific to a particular card reader or group of card readers. Card readers, and the cavities therein, vary in shape, size and configuration, and the size and/or shape of the wafers 42-48 may thus vary accordingly. In the second embodiment illustrated in FIGS. 4-6, the first and second legs 58a and 58b in the first wafer 48 extend downwardly from the plane of the first wafer 48. However, it will be apparent to those skilled in the art that the cavity shape in another card reader may allow a wafer to be positioned in the cavity such that the wafer (lacking any protrusions out of the main plane of the first wafer and/or lacking any protrusions or specifically shaped edges in the main plane of the wafer) abuts one or more internal walls of the card reader in the cavity to restrict movement of the wafer and stack in the cavity.

In addition, the first wafer 48 is the only wafer in the kit 40 in the illustrated second embodiment that comprises the legs 58a, 58b that extend from the plane of the wafer. However, those skilled in the art will appreciate that more than one wafer in the stack of wafers 41 may comprise one or more protrusions extending from the plane of the respective wafer for contacting the internal structure of the card reader 20 to restrict movement of the stack of wafers 41 in the card reader 20. For example (as in the third embodiment shown in FIGS. 7 and 8), one of the intermediate wafers 42, 44 may be a second wafer that is to be inserted into the card reader 20 after the first wafer 48. The second wafer may comprise one or more legs corresponding to the legs 58a, 58b in the first wafer 48. When the second wafer is positioned in the cavity on top of the first wafer 48, the legs in the second wafer may rest on the legs 58a, 58b in the first wafer, providing a more structurally stable configuration.

Although each of the four wafers 42-48 is shaped and sized to contact the internal structure of the cavity 26 in the illustrated second embodiment, it is apparent to those skilled in the art that this feature need not be ascribed to every wafer 42-48 in the kit of wafers 40. As the wafers 42-48 couple together to form a stack of wafers 41 in the cavity in the card reader 20, it may be that it is sufficient for one or more of the wafers 42-48 to be shaped and/or sized to contact the internal structure of the cavity 26 in the card reader 20 to prevent lateral movement of the stack of wafers 41.

Figure 7:
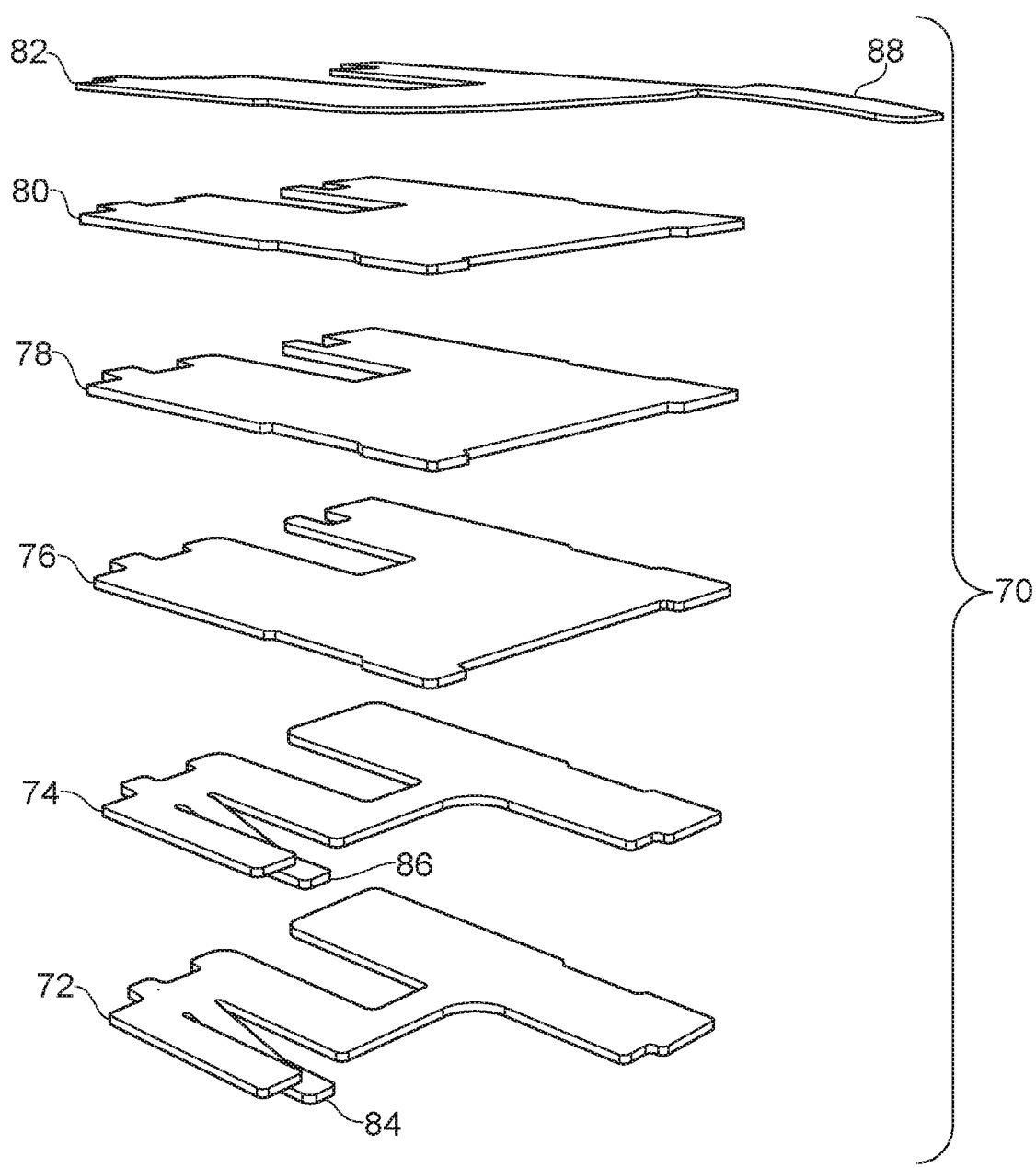
FIG. 7 is an illustration of a kit according to a third embodiment of the invention.
Figure 8:
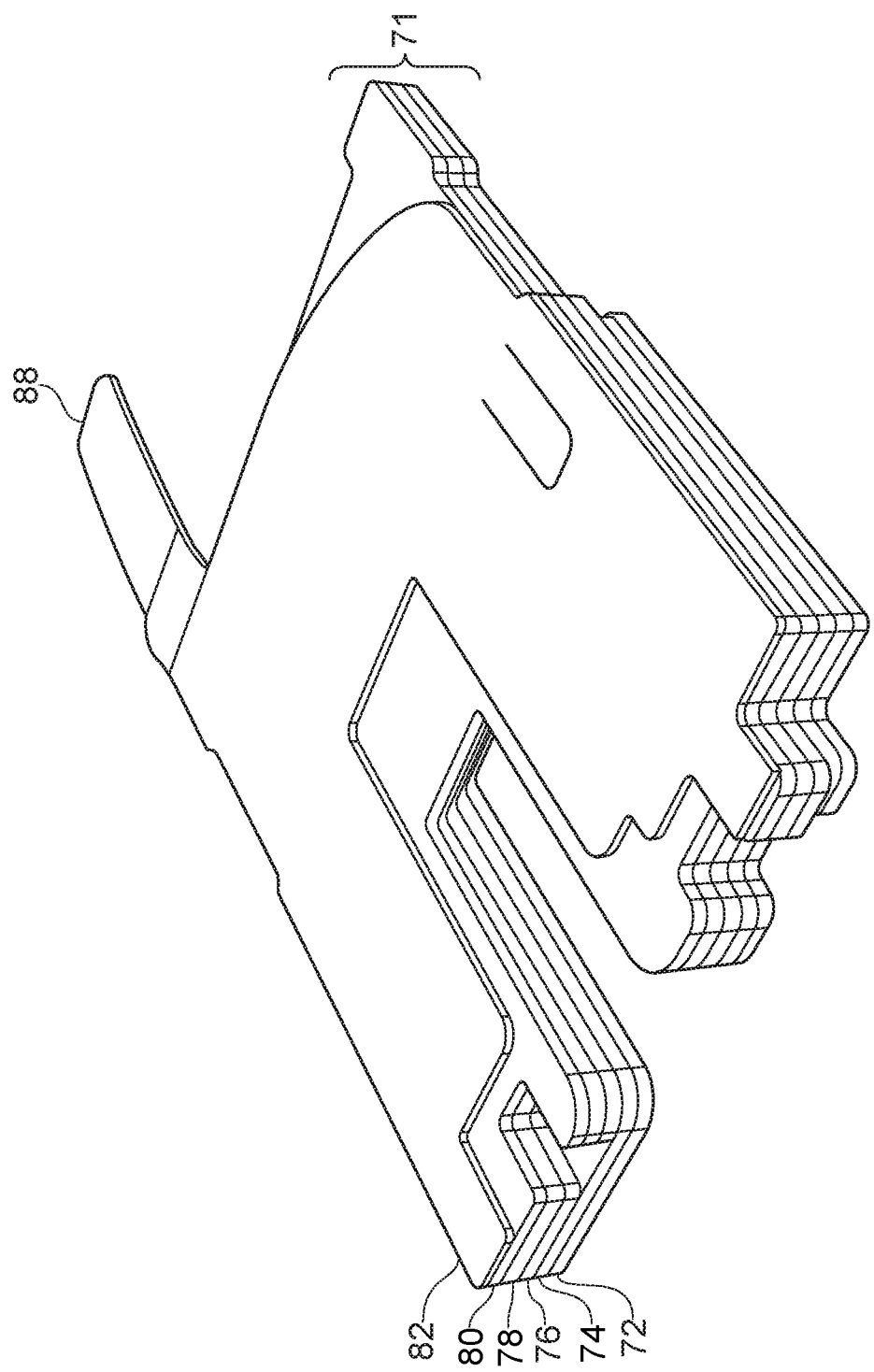
FIG. 8 is an illustration of a kit according to the third embodiment of the invention arranged in a stack.

FIG. 7 shows a kit 70 of wafers according to a third embodiment, and FIG. 8 shows the kit 70 according to the third embodiment in the form of a stack 71 of wafers. In this illustrated embodiment the kit 70 comprises six wafers 72-82 that can be individually inserted into the card reader 20 in an insertion direction 25 through the card slot 22 in the card reader 20 and positioned in the cavity 26 in the card reader 20. Unless otherwise indicated below, the wafers in the kit of wafers 70 are generally similar to the wafers described above in respect of the first and second embodiments. Thus, a first wafer 72 (which is to be inserted into the card reader 20 first) comprises a protrusion/leg 84 for contacting a part of the internal structure of the cavity 26 to prevent or restrict movement of the wafer 72/stack 71 inside the card reader 20. In this illustrated embodiment the second wafer 74 also comprises a protrusion/leg 86 that corresponds to the protrusion/leg 84 (i.e. it lies on the leg 84 of the first wafer 72 when inside the card reader 20 to improve the strength of the restriction against movement). The next three wafers in the kit 70 (wafers 76, 78, 80) are similar to wafers 32-36 in the first embodiment and wafers 42-46 in the second embodiment). According to the third embodiment, the final wafer 82 in the kit of wafers 70 (i.e. the wafer that is to be inserted into the card reader 20 last) further comprises an extended portion 88. This extended portion 88 is provided in order to block or restrict access to a further cavity inside the card reader 20.

Referring to the exploded card reader 20 shown in FIG. 4, there is a second cavity 90 located in front of the gate 29, and, even with a stack of wafers in place inside the main cavity 26, it might be possible for a tamper device to be placed inside this second cavity 90 to read the magnetic stripe on the card 24 as it is inserted. When the final wafer 82 is positioned in the card reader 20, the extended portion 88 of the final wafer 82 extends to at least partially cover the second cavity 90 in the card reader 20. The extended portion 88 therefore further restricts the available space in the card reader 20 in which an unauthorised object may be positioned.

Those skilled in the art will appreciate that the extended portion 88 may provide a further benefit. In particular, if an unauthorised object is already present in the second cavity 90 when the final wafer 82 is inserted into the card reader 20, then the extended portion 88 extends from the main part of the stack of wafers 71 to at least partially cover the unauthorised object and prevent it from contacting a part of a card 24 as or when the card 24 is inserted into the card reader 20. For example, the extended portion 88 may prevent the unauthorised object from contacting a magnetic stripe and/or electronic chip of a card 24 when it is inserted into the card reader 20.

The extended portion 88 of the final wafer 82 may cause the gate 29 in the card reader 20 to remain open once the final wafer 82 is inserted into the card slot 22.

The wafers 72-82 in the kit 70 according to the third embodiment may be coupled together using any of the coupling mechanisms described above with respect to the first embodiment and second embodiment. Any or all of the wafers 72-82 can be shaped and/or sized as described above with respect to the first embodiment or second embodiment. Any or all of the wafers 72-82 can be formed from the exemplary materials described above with respect to the first embodiment. Likewise, as in the first embodiment and the second embodiment, the number of wafers in the kit 70 can be varied depending on the shape and/or size of the cavity 26 or card reader 20. In this respect, it will be noted that the first wafer 72 and the second wafer 74 have a generally different shape to the wafers 76-80 to allow the first wafer 72 and the second wafer 74 to better fit a particular cavity shape. However, it will be appreciated that the overall shape of the wafers 72-82 shown in FIGS. 7 and 8 is not limiting, and the shape and/or size of one or more wafers in the kit 70 may be adapted for a particular card reader or group of card readers.

Figure 9:
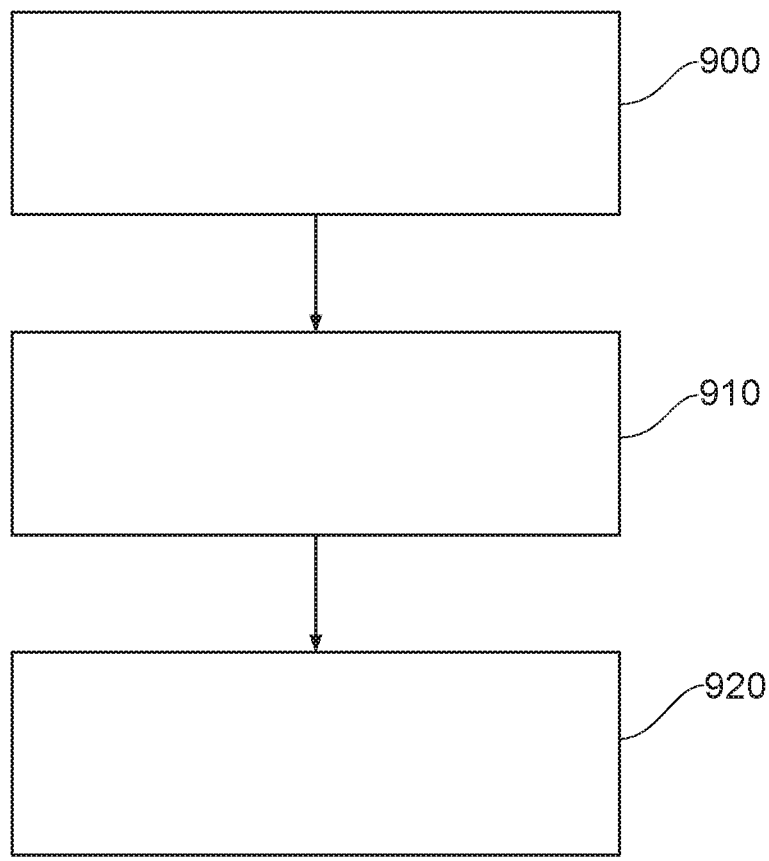
FIG. 9 is a flowchart of a method of using a kit according to embodiments of the disclosure.

FIG. 9 is a flowchart of a method for improving the security of a card reader 20 using a kit according to embodiments of the disclosure. The method may be carried out using, for example, the kit 30 described in relation to FIG. 3, the kit 40 described in relation to FIGS. 4, 5 and 6 or the kit 70 described in relation to FIGS. 7 and 8.

As described above, the wafers may be configured to couple together using an adhesive. The method may thus begin in step 900, in which the adhesive is applied to a surface of at least one wafer in the kit prior to inserting the wafer into the card reader 20. For example, the method may comprise applying adhesive tape to the at least one wafer prior to insertion. In an alternative embodiment, the method may comprise peeling away a cover to reveal adhesive tape on the wafer. In alternative embodiments where the adhesive is already present on the at least one wafer (and exposed to enable the adhesive to couple wafers together), step 900 can be omitted.

In step 910 (which is optional and depends on particular types of adhesive being used on the at least one wafer), a temporary barrier coating may be applied to the adhesive tape so that the adhesive does not interfere with the insertion process (e.g. by adhering to part of the card slot 22). In one embodiment, the temporary barrier coating comprises a volatile substance. The volatile substance may comprise water or any other suitable substance. In the aforementioned example, the method may thus further comprise covering the adhesive tape with water prior to insertion. The water provides a barrier that temporarily reduces the stickiness of the adhesive tape to prevent the wafer from adhering to the card reader 20 during insertion. After the water evaporates, the adhesive couples the wafers together to form the stack of wafers in the card reader 20.

The method then proceeds to step 920, in which each wafer in the kit is individually inserted into the card reader 20 via a card slot 22 in the card reader 20.

The wafers may be intended to be inserted into the card reader 20 in a predetermined sequence. Thus, the wafers may be individually inserted through the card slot 22 and positioned in a cavity 26 in the card reader 20 according to the predetermined sequence. For example, the kit may comprise a first wafer and a second wafer, wherein the second wafer is intended to be inserted into the card reader 20 after the first wafer has been inserted into the card reader 20. In that example, the method thus comprises first inserting the first wafer and then inserting the second wafer.

In some embodiments, the method may proceed directly from step 900 to step 920. That is, the wafers may be individually inserted into the card reader 20 after an adhesive has been applied without first applying a temporary barrier coating.

In alternative embodiments, the method begins at 920. The wafers in the kit may thus be individually inserted into the card reader 20 via the card slot 22 in the card reader 20 without first applying an adhesive to one or more of the wafers. At least one of the wafers may be provided with an adhesive already applied, or the wafers may be configured to couple together using a mechanism that does not require adhesive (for example, the wafers may be shaped to slot together after insertion).

There is therefore provided a kit and method for improving the security of a card reader.

The invention has been illustrated and described in detail in the figures and the description, but the figures and above description are to be considered illustrative or exemplary and not limiting; and it will be appreciated that the invention is not limited to the disclosed embodiments.

Variations to the disclosed embodiments can be understood and effected by those skilled in the art in practicing the claimed invention. The word "comprising" in the claims does not exclude other elements or steps, and "a" or "an" does not exclude a plurality.

The invention claimed is:

1. A kit for improving the security of a card reader, the kit comprising:
   a plurality of wafers for insertion individually into the card reader via a card slot in the card reader, wherein each wafer is shaped or sized such that the wafer can be inserted through the card slot in an insertion direction and positioned in a cavity in the card reader,
   wherein the plurality of wafers are configured to couple together when inside the cavity to form a stack of wafers,
   wherein one or more wafers in the plurality of wafers is shaped or sized to fit the cavity in the card reader such that movement of the stack of wafers within the cavity is restricted,
   wherein the one or more wafers are shaped or sized such that the one or more wafers comprise one or more protrusions or edges for contacting one or more parts of an internal structure of the card reader such that movement of the stack of wafers within the cavity is restricted, and
   wherein the one or more wafers comprising the one or more protrusions or edges comprises a first wafer that is for insertion into the card reader prior to insertion of any other wafer in the plurality of wafers.

2. A kit for improving the security of a card reader, the kit comprising:
   a plurality of wafers for insertion individually into the card reader via a card slot in the card reader, wherein each wafer is shaped or sized such that the wafer can be inserted through the card slot in an insertion direction and positioned in a cavity in the card reader,
   wherein the plurality of wafers are configured to couple together when inside the cavity to form a stack of wafers,
   wherein one or more wafers in the plurality of wafers is shaped or sized to fit the cavity in the card reader such that movement of the stack of wafers within the cavity is restricted,
   wherein the one or more wafers are shaped or sized such that the one or more wafers comprise one or more protrusions or edges for contacting one or more parts of an internal structure of the card reader such that movement of the stack of wafers within the cavity is restricted, and
   wherein the one or more protrusions are deformable to enable the respective wafer to be inserted into the card reader via the card slot.

3. A kit for improving the security of a card reader, the kit comprising:
   a plurality of wafers for insertion individually into the card reader via a card slot in the card reader, wherein each wafer is shaped or sized such that the wafer can be inserted through the card slot in an insertion direction and positioned in a cavity in the card reader,
   wherein the plurality of wafers are configured to couple together when inside the cavity to form a stack of wafers,
   wherein the plurality of wafers comprises a final wafer that is for insertion into the card reader after all other wafers in the plurality of wafers have been inserted into the card reader, and
   wherein the final wafer is shaped to prevent an unauthorised object positioned in the cavity from contacting a magnetic stripe or an electronic chip of a card as or when the card is inserted into the card reader.

4. A kit for improving the security of a card reader, the kit comprising:
   a plurality of wafers for insertion individually into the card reader via a card slot in the card reader, wherein each wafer is shaped or sized such that the wafer can be inserted through the card slot in an insertion direction and positioned in a cavity in the card reader,
   wherein the plurality of wafers are configured to couple together when inside the cavity to form a stack of wafers,
   wherein the plurality of wafers comprises a final wafer that is for insertion into the card reader after all other wafers in the plurality of wafers have been inserted into the card reader, and
   wherein the final wafer is shaped such that the stack of wafers prevents a card from being fully inserted into the card reader when an unauthorised object is also present in the card reader above the final wafer.

5. A method for improving the security of a card reader, comprising the steps of:
   providing a kit for improving the security of a card reader, the kit comprising:
      a plurality of wafers for insertion individually into the card reader via a card slot in the card reader, wherein each wafer is shaped or sized such that the wafer can be inserted through the card slot in an insertion direction and positioned in a cavity in the card reader,
      wherein the plurality of wafers are configured to couple together when inside the cavity to form a stack of wafers, and
   individually inserting each wafer in the plurality of wafers into the card reader via the card slot in the card reader,
   wherein the plurality of wafers are configured to couple together using an adhesive applied to a surface of at least one wafer in the plurality of wafers, and wherein, for each of the at least one wafers with an adhesive applied to its surface, the method further comprises applying a temporary barrier coating to the adhesive prior to inserting the wafer into the card reader.

6. The method as claimed in claim 5, wherein the temporary barrier coating comprises a volatile substance.

* * * * *